(12) United States Patent
Tanaka et al.

(10) Patent No.: US 12,319,047 B2
(45) Date of Patent: Jun. 3, 2025

(54) FIBER REINFORCED RESIN MOLDED BODY AND METHOD FOR PRODUCING THE SAME

(71) Applicant: KURASHIKI BOSEKI KABUSHIKI KAISHA, Kurashiki (JP)

(72) Inventors: Tadaharu Tanaka, Osaka (JP); Takashi Nakamura, Osaka (JP); Yoichi Hiraishi, Osaka (JP); Yuta Nakame, Osaka (JP); Yuki Komai, Osaka (JP)

(73) Assignee: Kurashiki Boseki Kabushiki Kaisha, Okayama (JP)

( * ) Notice: Subject to any disclaimer, the term of this patent is extended or adjusted under 35 U.S.C. 154(b) by 96 days.

(21) Appl. No.: 17/775,724

(22) PCT Filed: Nov. 5, 2020

(86) PCT No.: PCT/JP2020/041330
§ 371 (c)(1),
(2) Date: May 10, 2022

(87) PCT Pub. No.: WO2021/095626
PCT Pub. Date: May 20, 2021

(65) Prior Publication Data
US 2022/0388275 A1    Dec. 8, 2022

(30) Foreign Application Priority Data
Nov. 13, 2019   (JP) ................. 2019-205717

(51) Int. Cl.
*B32B 5/26* (2006.01)
*B32B 5/02* (2006.01)
(Continued)

(52) U.S. Cl.
CPC .............. *B32B 5/266* (2021.05); *B32B 5/022* (2013.01); *B32B 38/1858* (2013.01);
(Continued)

(58) Field of Classification Search
CPC ..... B32B 5/266; B32B 5/022; B32B 38/1858; B32B 2250/20; B32B 2260/021;
(Continued)

(56) References Cited

U.S. PATENT DOCUMENTS

| | | | |
|---|---|---|---|
| 2015/0376353 A1 | 12/2015 | Takebe et al. | |
| 2020/0148846 A1* | 5/2020 | Furukawa | ............. C08G 73/10 |
| 2020/0152975 A1 | 5/2020 | Archer et al. | |

FOREIGN PATENT DOCUMENTS

| | | |
|---|---|---|
| EP | 3 925 752 | 12/2021 |
| JP | 10-166436 | 6/1998 |

(Continued)

OTHER PUBLICATIONS

Machine Translation of JP 2006-130698 A. (Year: 2006).*
(Continued)

*Primary Examiner* — Brian Handville
(74) *Attorney, Agent, or Firm* — HSML P.C.

(57) ABSTRACT

A resin-integrated fiber sheet 1 for vacuum forming for producing a fiber reinforced resin molded body through vacuum forming includes: unidirectional continuous fibers 2 that are spread fibers of a continuous fiber group and arrayed in parallel in one direction; bridging fibers 3 lying in directions crossing the unidirectional continuous fibers 2; and thermoplastic resin 4 present on part of the surface of the unidirectional continuous fibers 2 to unify the unidirectional continuous fibers 2 and the bridging fibers 3. A fiber reinforced resin molded body of the present invention is a vacuum formed body in which two or more of the resin-integrated fiber sheets 1 are stacked. A method for producing the molded body of the present invention includes subjecting the resin-integrated fiber sheets 1 to vacuum forming from a lower mold with a vacuum line and pressurizing the sheets with compressed air from an upper mold. Thus, the present invention provides a resin-integrated fiber sheet for vacuum (Continued)

forming having excellent shapeability and avoiding voids, a molded body including the same, and a method for producing the molded body including the same.

8 Claims, 7 Drawing Sheets

(51) Int. Cl.
  *B32B 38/18* (2006.01)
  *B29C 51/10* (2006.01)
  *B29K 105/08* (2006.01)
(52) U.S. Cl.
  CPC ...... *B29C 51/10* (2013.01); *B29K 2105/0881* (2013.01); *B32B 2250/20* (2013.01); *B32B 2260/021* (2013.01); *B32B 2260/046* (2013.01); *B32B 2262/101* (2013.01); *B32B 2262/106* (2013.01); *B32B 2264/0235* (2013.01); *B32B 2264/025* (2013.01); *B32B 2264/0257* (2013.01); *B32B 2264/0264* (2013.01); *B32B 2264/0278* (2013.01); *B32B 2307/516* (2013.01); *B32B 2307/732* (2013.01)
(58) Field of Classification Search
  CPC ........ B32B 2260/046; B32B 2262/101; B32B 2262/106; B32B 2264/0235; B32B 2264/025; B32B 2264/0257; B32B 2264/0264; B32B 2264/0278; B32B 2307/516; B32B 2307/732; B32B 5/00; B32B 5/12; B32B 2260/023; B32B 5/26; B32B 2307/718; B29C 51/10; B29C 70/44; B29K 2105/0881; B29B 15/12
  See application file for complete search history.

(56) References Cited

FOREIGN PATENT DOCUMENTS

| | | |
|---|---|---|
| JP | 2000-280385 | 10/2000 |
| JP | 2001-341189 | 12/2001 |
| JP | 2006-130698 | 5/2006 |
| JP | 2014-004797 | 1/2014 |
| JP | 2014-050981 | 3/2014 |
| JP | 2014-125532 | 7/2014 |
| JP | 2016196142 A * | 11/2016 |
| JP | 2017-109408 | 6/2017 |
| JP | 2018-012313 | 1/2018 |
| WO | 2020/246440 | 12/2020 |

OTHER PUBLICATIONS

Machine Translation of JP 2016-196142 A. (Year: 2016).*
International Search Report issued in International Application No. PCT/JP2020/041330, Jan. 12, 2021, 7 pages w/ translation.
Extended European Search Report issued in corresponding European Patent Application No. 20886341.5, Nov. 6, 2023, 7 pages.

* cited by examiner

FIBER REINFORCED RESIN MOLDED BODY AND METHOD FOR PRODUCING THE SAME

TECHNICAL FIELD

The present invention relates to a resin-integrated fiber sheet for vacuum forming using semipreg, a molded body including the same, and a method for producing the molded body including the same.

BACKGROUND ART

Carbon fibers, which are a reinforcing fiber material, are combined with a variety of matrix resins, and the resultant fiber reinforced plastics have been widely used in various fields for various applications. In the aerospace field and the general industrial fields that require high mechanical properties, high heat resistance, etc., unidirectional continuous fibers are used in combination with a thermoplastic resin as a matrix resin. Prepregs that are obtained by fully impregnating a carbon fiber material with resin have been used conventionally, because they have excellent impact resistance as a composite material and are considered to shorten the molding time and reduce the molding cost. However, in the case of using the fully impregnated prepregs, stacked prepreg sheets need to be preheated for a certain period of time, and they are hard as they are, increasing the molding time. For these reasons, semipregs, which are not fully impregnated with resin, are receiving attention. The semipregs are base sheets in which a matrix resin adhering to a fiber material by fusion is not impregnated or partially impregnated into the fiber material. The semipregs are soft and have excellent shapeability. Moreover, the semipregs can be molded directly, enhancing the molding efficiency.

In molding of the fiber reinforced resin, a fiber material is impregnated with a thermoplastic resin. If short fibers are used, they need to be processed into a non-woven fabric, largely impairing the efficiency. If continuous fibers are used, they may be misaligned and disordered, or defects such as voids or wrinkles may occur. Under such circumstances, there are demands for more suitable materials that can be used for direct molding.

Patent Document 1 discloses a base material including non-woven fabrics and a film as an outermost layer that is stacked on the non-woven fabric. Such a base material is advantageous in transportation, etc., but requires a step of processing reinforcing fibers into non-woven fabrics. This configuration is difficult to apply to continuous fibers. Further, adhering the film to the non-woven fabrics narrows the production conditions of the base material, and the mass of the base material cannot be freely determined. Moreover, the film on the outermost layer makes the base material hard, resulting in poor shapeability. Patent Document 2 discloses an apparatus for producing a prepreg molded product using prepregs or semipregs, but there is room for further improvement in the molding method.

PRIOR ART DOCUMENTS

Patent Documents

Patent Document 1: JP 2014-050981 A
Patent Document 2: JP 2017-109408 A

DISCLOSURE OF INVENTION

Problem to be Solved by the Invention

As described above, the conventional techniques are unsatisfactory in the shapeability and have difficulty avoiding voids.

To solve the above conventional problems, the present invention provides a resin-integrated fiber sheet for vacuum forming having excellent shapeability and avoiding voids, a molded body including the same, and a method for producing the molded body including the same.

Means for Solving Problem

A resin-integrated fiber sheet for vacuum forming according to the present invention is a resin-integrated fiber sheet for vacuum forming for producing a fiber reinforced resin molded body through vacuum forming,
wherein the resin-integrated fiber sheet includes:
A. unidirectional continuous fibers that are spread fibers of a continuous fiber group and arrayed in parallel in one direction;
B. bridging fibers that lie in directions crossing the unidirectional continuous fibers; and
C. thermoplastic resin that is present on part of the surface of the unidirectional continuous fibers to unify the unidirectional continuous fibers and the bridging fibers.

A fiber reinforced resin molded body of the present invention is a vacuum formed body in which two or more of the resin-integrated fiber sheets are stacked.

A method for producing a fiber reinforced resin molded body of the present invention is a method for producing a fiber reinforced resin molded body by subjecting the resin-integrated fiber sheets to vacuum forming,
wherein the resin-integrated fiber sheets are subjected to the vacuum forming from a lower mold with a vacuum line and pressurized with compressed air from an upper mold.

Effect of the Invention

The resin-integrated fiber sheet of the present invention includes: (A) unidirectional continuous fibers that are spread fibers of a continuous fiber group and arrayed in parallel in one direction; (B) bridging fibers that lie in directions crossing the unidirectional continuous fibers; and (C) thermoplastic resin that is present on part of the surface of the unidirectional continuous fibers to unify the unidirectional continuous fibers and the bridging fibers. The thermoplastic resin evenly permeates and spreads through the resin-integrated fiber sheets and between the resin-integrated fiber sheets through vacuum forming, whereby a molded body having excellent shapeability (moldability) and avoiding voids is obtained. The method for producing the fiber reinforced resin molded body of the present invention speeds up the molding cycle, thus producing a molded body of high quality in a short time.

BRIEF DESCRIPTION OF DRAWINGS

FIG. 5A illustrates a preparation process, FIG. 5B illustrates a heating process, FIG. 5C illustrates a heating vacuum pressure forming process, and FIG. 5D illustrates cooling and demolding processes.

DESCRIPTION OF THE INVENTION

Figure 1:
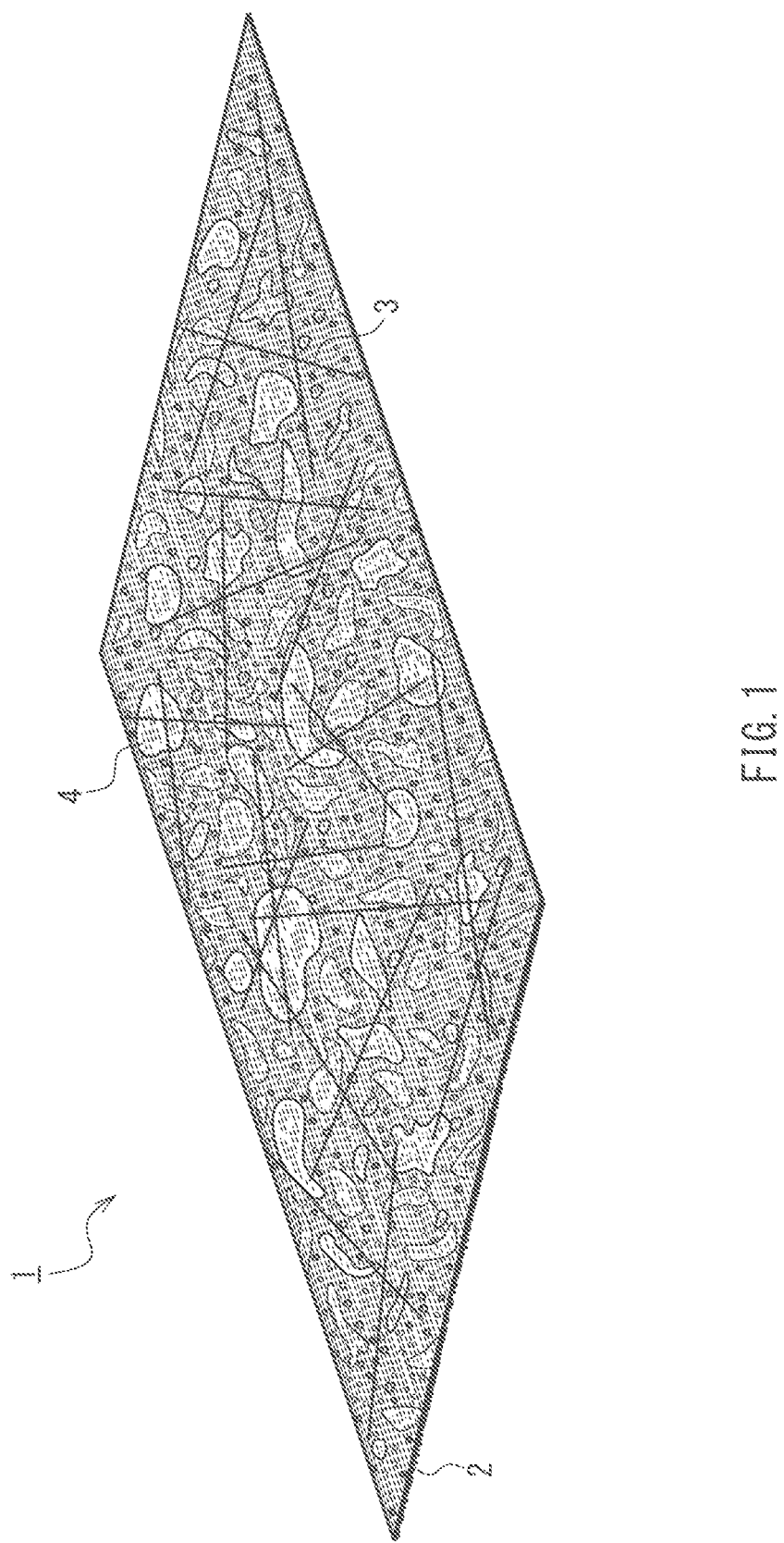
FIG. 1 is a schematic perspective view of a resin-integrated carbon fiber sheet according to an embodiment of the present invention.

The resin-integrated fiber sheet for vacuum forming according to the present invention includes unidirectional continuous fibers as primary fibers that are spread and arrayed in parallel in one direction. The resin-integrated fiber sheet further includes bridging fibers as secondary fibers that lie in directions crossing the unidirectional continuous fibers. It is preferred that the primary fibers constitute 75 to 99 mass % and the secondary fibers constitute 1 to 25 mass % with respect to a total 100 mass % of the fibers. The thermoplastic resin in a powder form is applied to the unidirectional continuous fibers and the bridging fibers from above and thermally fused on part of the surface of the unidirectional continuous fibers to unify the unidirectional continuous fibers and the bridging fibers. In the sheet, the thermally fused thermoplastic resin unifies the unidirectional continuous fibers and the bridging fibers, thus improving the handleability and the operability during stacking and vacuum forming the sheets.

The resin-integrated fiber sheet is preferably a semipreg in which the thermoplastic resin in a powder form serving as a matrix adheres to the surfaces of the unidirectional continuous fibers and the bridging fibers through thermal fusion. In the semipreg, the thermoplastic resin on the surfaces evenly permeates and spreads through the resin-integrated fiber sheets and between the resin-integrated fiber sheets through vacuum forming. Thus, it is possible to produce a molded body having excellent shapeability (moldability) and avoiding voids.

The unidirectional continuous fibers constitute preferably 75 to 99 mass %, more preferably 80 to 97 mass %, and further preferably 85 to 95 mass %, with respect to the total 100 mass % of the unidirectional continuous fibers and the bridging fibers. The bridging fibers constitute preferably 1 to 25 mass %, more preferably 3 to 20 mass %, and further preferably 5 to 15 mass %, with respect to the total 100 mass % of the unidirectional continuous fibers and the bridging fibers. Within the above range, a resultant resin-integrated fiber sheet has high unity of the unidirectional continuous fibers and a high tensile strength in the width direction.

The resin-integrated fiber sheet preferably has a fiber volume (Vf) of 20 to 65 vol % and a thermoplastic resin volume of 35 to 80 vol %, and more preferably a fiber volume (Vf) of 25 to 60 vol % and a thermoplastic resin volume of 40 to 75 vol %. Within the above range, the resin component of the resin-integrated fiber sheet serves as a matrix resin component in the molded body. In other words, it is unnecessary to further add resin for production of a molded body. The mass of the resin-integrated fiber sheet per unit area is preferably 10 to 3000 g/m$^2$, more preferably 20 to 2000 g/m$^2$, and further preferably 30 to 1000 g/m$^2$.

The unidirectional continuous fibers are preferably at least one selected from the group consisting of carbon fibers, glass fibers, and high elastic modulus fibers having an elastic modulus of 380 cN/dtex or more. Examples of the high elastic modulus fibers include aramid fibers, particularly para-aramid fibers (elastic modulus: 380 to 980 cN/dtex), polyalylate fibers (elastic modulus: 600 to 741 cN/dtex), heterocyclic polymer fibers (PBO, elastic modulus: 1060 to 2200 cN/dtex), high molecular weight polyethylene fibers (elastic modulus: 883 to 1413 cN/dtex), and polyvinyl alcohol fibers (PVA, strength: 14 to 18 cN/dtex) (Encyclopedia of Fiber, p. 522, published by Maruzen, issued on Mar. 25, 2002). These fibers are useful as resin reinforcing fibers. In particular, carbon fibers are useful.

The thickness of the resin-integrated fiber sheet is preferably 0.01 to 5.0 mm per sheet. The fiber sheet having a thickness within this range is suitable for vacuum forming. In vacuum forming, two or more of the resin-integrated fiber sheets are stacked. The number of the sheets to be stacked is preferably 2 to 70, and more preferably 5 to 50.

Examples of the thermoplastic resin include, but are not limited to, polyimide resins, polycarbonate resins, polypropylene resins, polyester resins, polyethylene resins, acrylic resins, phenoxy resins, polystyrene resins, polyimide resins, and polyether ether ketone resins.

A preferable resin adhesion state of the resin-integrated fiber sheet of the present invention is such that melt-solidified resin adheres to the surface of the spread fiber sheet, and the resin is not impregnated inside the fiber sheet or partially impregnated in the fiber sheet. Resin-integrated fiber sheets with the above resin adhesion state are suitable for vacuum forming.

The width of the spread fiber sheet is preferably 0.1 to 5.0 mm per 1000 constituent fibers in the case of using carbon fibers. Specifically, when a large tow (e.g., 50K or 60K) is used, the spread fiber sheet has a width of about 0.1 to 1.5 mm per 1000 constituent fibers. When a regular tow (e.g., 12K or 15K) is used, the spread fiber sheet has a width of about 0.5 to 5.0 mm per 1000 constituent fibers. The K value indicates 1000 filaments. The larger the number of fibers in a tow, the more likely that the fibers get twisted and the tow is difficult to spread, narrowing the width of the spread fiber sheet. Tows sold by carbon fiber manufacturers are opened to be easy-to-use spread fiber sheets for production of various molded products. It is preferred that the carbon fiber bundle (tow) as feed yarns includes 5,000 to 50,000 fibers per bundle, and the number of the carbon fiber bundles (tows) to be fed is 10 to 280. A sheet composed of a plurality of spread carbon fiber bundles (tows) tends to cleave between the bundles (tows). Bridging fibers lying in various directions, which are adhesively fixed to the sheet with resin, can prevent such cleavage between the tows.

The average length of the bridging fibers is preferably 1 mm or more, and more preferably 5 mm or more. Within the above range of the average length of the bridging fibers, a resultant carbon fiber sheet is strong in the width direction and excellent in handleability. The maximum length of the bridging fibers is the width of the sheet.

The production method of the resin-integrated fiber sheet of the present invention includes the following processes, with a carbon fiber sheet exemplified as a fiber sheet:

(1) spreading a carbon fiber filament group by at least one selected from the group consisting of passage through a plurality of rollers, passage through a plurality of spreading bars, and air spreading, and arraying the spread carbon fiber filament group in parallel in one direction; and generating bridging fibers from the carbon fiber filament group during or after spreading of the carbon fiber filament group or dropping bridging fibers on the carbon fiber sheet during or after spreading of the carbon fiber filament group so that one or more of the bridging fibers is present on average per 10 mm² of the carbon fiber sheet. In the case of spreading the carbon fiber filament group by passage through rollers or spreading bars, the bridging fibers can be generated from the carbon fiber filament group by tensioning the carbon fiber filament group during spreading. The tension of the carbon fiber filament group may be in a range from 2.5 to 30 N per 15,000 filaments, for example. In the case of adopting air spreading, the bridging fibers are preferably generated by rollers or spreading bars after air spreading. When the bridging fibers are generated from the carbon fiber filament group, the bridging fibers are in a state of crossing the carbon fibers constituting the carbon fiber sheet. Here, crossing includes tangling. For example, the bridging fibers are partially or entirely present inside the carbon fiber sheet and stereoscopically cross the unidirectionally arrayed carbon fibers.

(2) applying resin powder to the spread carbon fiber sheet; and (3) heat-melting the resin powder in a pressure-free state (no pressure applied) and cooling it so that the resin is present on part of the surface of the carbon fiber sheet. At this time, the resin on the surface adhesively fixes the bridging fibers to the carbon fiber sheet.

The fiber reinforced resin molded body of the present invention is a molded body obtained by stacking two or more of the above resin-integrated fiber sheets and subjecting the stacked resin-integrated fiber sheets to vacuum forming. The two or more of the resin-integrated fiber sheets may be stacked in different directions so that the unidirectional continuous fibers of the sheets are oriented in different directions. For example, the sheets may be stacked at angles of 0°, 45°, 90°, 135°, 180° . . . , 0°, 90°, 180° . . . , or the like. By doing so, a molded body having the required mechanical properties can be obtained. The molded body is suitable as a large sheet-like material, including an automobile hood, a door, a bumper, and a table top plate.

In the production method of the fiber reinforced resin molded body of the present invention, at the time of producing the fiber reinforced resin molded body by vacuum forming the resin-integrated fiber sheets, the resin-integrated fiber sheets are vacuum formed from a lower mold with a vacuum line and pressed with compressed air from an upper mold. The vacuum forming is preferably vacuum pressure forming. Specifically, the following method is preferred, using a vacuum forming machine that includes a lower mold with a vacuum line and an upper mold with a bagging film on its lower surface:

a. placing a stack of two or more of the resin-integrated fiber sheets on the lower mold and covering a bagging film over the stack;

b. reducing the pressure from the vacuum line of the lower mold while heating the stack;

c. pressurizing the stack heated to a temperature equal to or higher than the softening point of the thermoplastic resin, with compressed air from above the bagging film to perform vacuum pressure forming; and d. cooling the stack while maintaining the pressurizing condition and removing a resultant cooled molded body.

With the above molding method, 10 minutes/1 cycle is possible, and preferably 7 minutes/1 cycle is possible. The bagging film is also called a vacuum bagging film.

Figure 2:
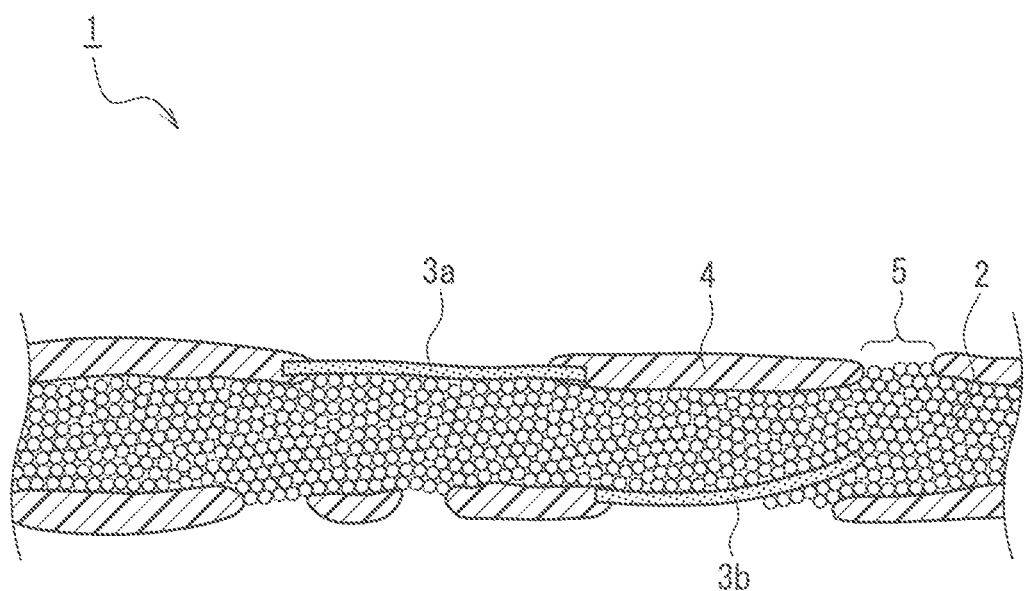
FIG. 2 is a schematic cross-sectional view of the resin-integrated carbon fiber sheet.

Hereinafter the present invention will be described using drawings. In the drawings, the same reference numerals are assigned to the same components. FIG. 1 is a schematic perspective view of a resin-integrated carbon fiber sheet 1 according to an embodiment of the present invention, and FIG. 2 is a schematic cross-sectional view of the resin-integrated carbon fiber sheet 1. Bridging fibers 3 are oriented in various directions on the surface of spread unidirectional carbon fibers 2. Melt-solidified resin 4 adheres to the surface of the unidirectional carbon fibers 2. The resin 4 is not impregnated inside the unidirectional carbon fibers 2 or partially impregnated therein. The resin 4 fixes the bridging fibers 3 adhesively to the surface of the unidirectional carbon fibers 2. As illustrated in FIG. 2, bridging fibers 3a and 3b are present on the surfaces of the unidirectional carbon fibers 2. The bridging fiber 3a is present entirely on the surface of the unidirectional carbon fibers 2. The bridging fiber 3b is partially present on the surface of the unidirectional carbon fibers 2 and partially enters the unidirectional carbon fibers 2 and crosses the carbon fibers. The resin 4 fixes the bridging fibers 3 adhesively to the surface of the unidirectional carbon fibers 2. The carbon fiber sheet 1 includes parts to which the resin 4 adheres and parts 5 to which the resin 4 does not adhere. The parts 5 to which the resin does not adhere serve as air paths through which air inside the fiber sheet escapes during formation of a fiber reinforced resin molded product by heating and vacuuming stacked resin-integrated carbon fiber sheets 1. The application of pressure (pressurization) enables the surface resin to be easily impregnated into the entire fiber sheet. As a result, the resin 4 becomes a matrix resin of the fiber reinforced resin molded body.

Figure 3:
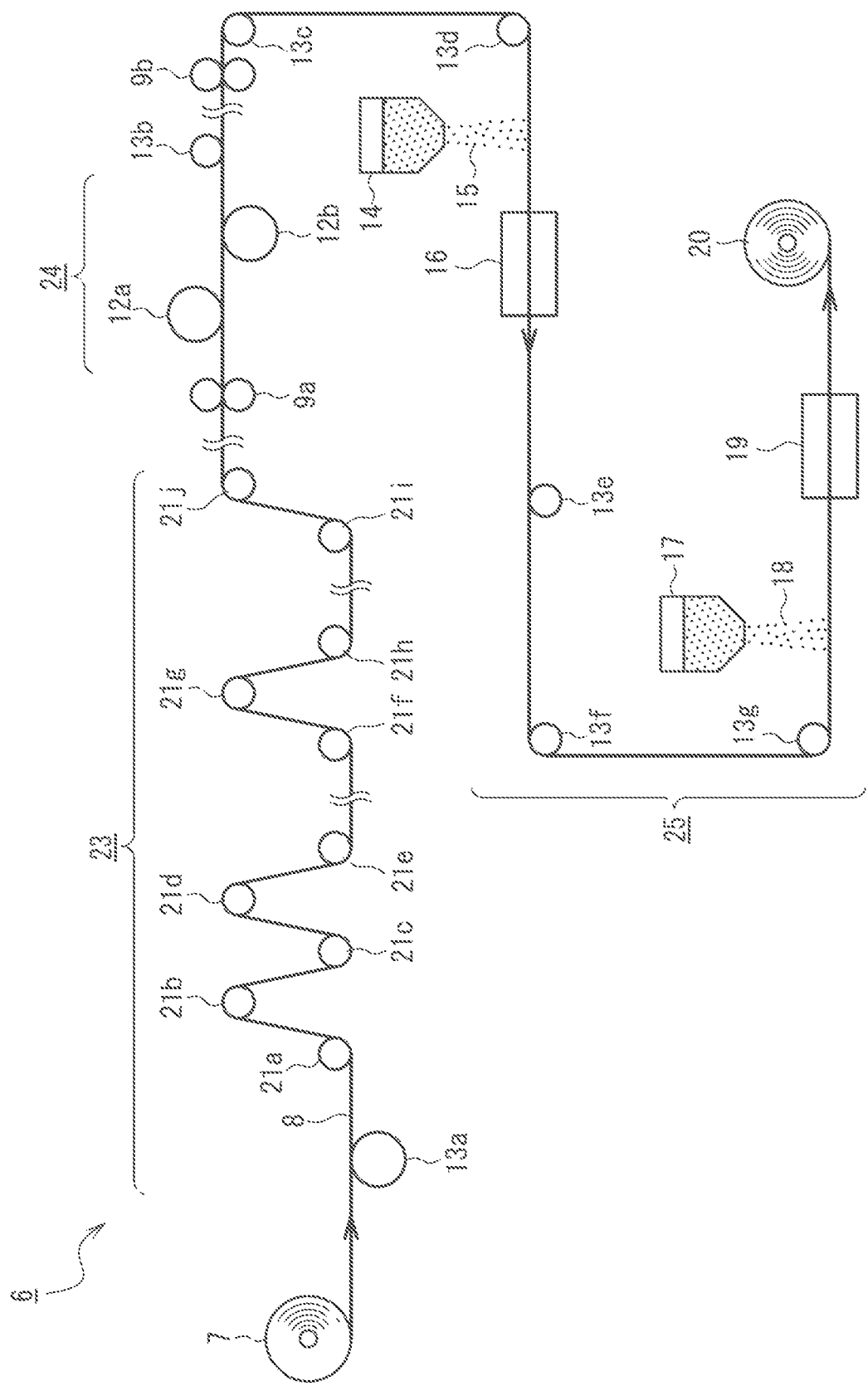
FIG. 3 is a schematic process diagram illustrating a production method of the resin-integrated carbon fiber sheet.

FIG. 3 is a schematic process diagram illustrating a production method of a resin-integrated carbon fiber sheet according to an embodiment of the present invention. Carbon fiber filament groups (tows) 8 are drawn out from a plurality of feed bobbins 7 and conveyed between spreading rollers 21a to 21j to spread the tows (roller spreading process 23). Air spreading may be used instead of roller spreading. The spreading rollers may be fixed, rotate, or vibrate in the width direction.

After the spreading process, the spread tows are nipped between nip rollers 9a and 9b and conveyed between bridge rollers 12a and 12b disposed therebetween while being tensioned at, e.g., 2.5 to 30 N per 15,000 filaments (corresponding to a carbon fiber filament group fed from one feed bobbin) to generate bridging fibers (bridging fiber generating process 24). The bridge rollers may rotate or vibrate in the width direction. The bridge rollers may have, e.g., a pearskin finish surface, an uneven surface, or a mirror surface to generate bridging fibers from the carbon fiber filament groups through bending, fixation, rotation, vibration, or a combination of these. 13a to 13g are guide rollers.

Then, dry resin powder 15 is sprinkled on the front surface of the spread fiber sheet from a powder feed hopper 14, and the sheet is fed into a heater 16 in a pressure-free state to heat and melt the dry resin powder 15, and cooled between guide rollers 13e to 13g. Thereafter, dry resin powder 18 is sprinkled on the back surface of the spread fiber sheet from a powder feed hopper 17, and the sheet is fed into a heater 19 in a pressure-free state to heat and melt the dry resin powder 18, and cooled and taken up on a take-up roller 20 (resin powder applying process 25). For example, the dry resin powders 15 and 18 are phenoxy resin (melting point: 180° C.), the temperatures inside the heaters 16 and 19 are 20° C. to 60° C. higher than the melting point of the resin, and the residence times therein are 4 seconds each. The spread carbon fiber sheet thus obtained is strong in the width direction and can be handled as a sheet without separation of the constituent carbon fibers.

For application of the resin powder, powder coating, electrostatic coating, spraying, fluidized-bed coating, or other methods may be used. Powder coating is preferred, in which resin powder is dropped on the surface of a carbon fiber sheet. For example, thy resin powder is sprinkled on a spread carbon fiber sheet.

Figure 4:
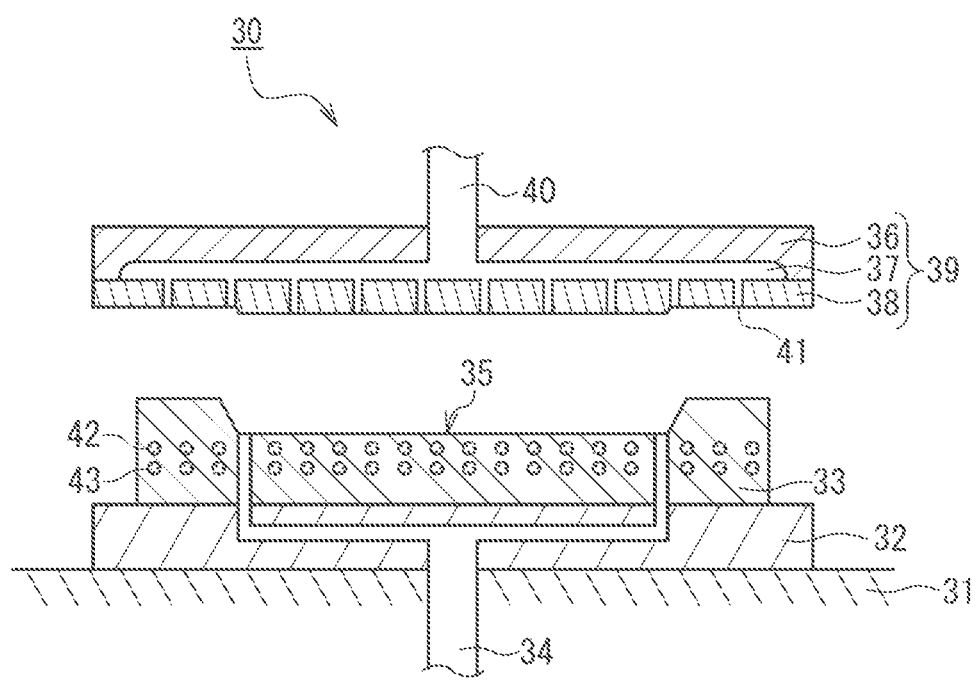
FIG. 4 is a schematic cross-sectional view of a vacuum pressure forming machine.

FIG. 4 is a schematic cross-sectional view of a vacuum pressure forming machine according to an embodiment of the present invention. A vacuum pressure forming machine 30 includes a lower mold 33 and an upper mold 39. The lower mold 33 is fixed to a base 31 and a mold base 32. A vacuum line 34 extends to a mold surface 35. The upper mold 39 has a compressed air pipe 40, from which compressed air can be fed downward through an air groove 37 and air vents 41 of a faceplate 38. The lower mold 33 can control heating and cooling to a predetermined temperature with a heater 42 (e.g., electromagnetic induction heater, resistance wire heater, infrared heater) and a water cooled tube 43.

Figure 5C:
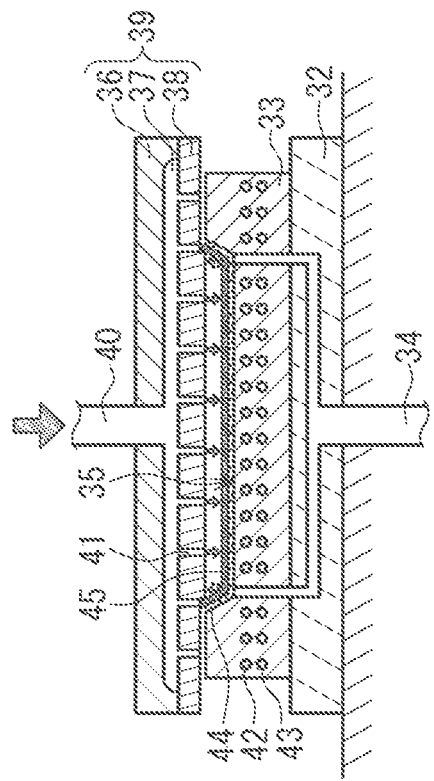
FIGS. 5A to 5D are schematic process diagrams illustrating a molding method.
Figure 5D:
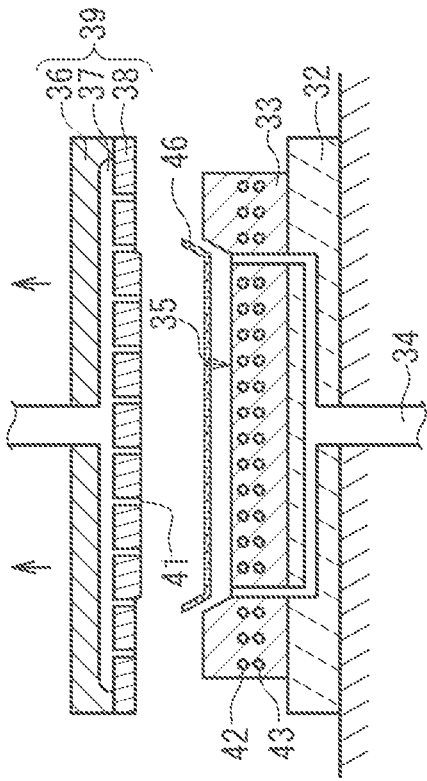
Figure 5A:
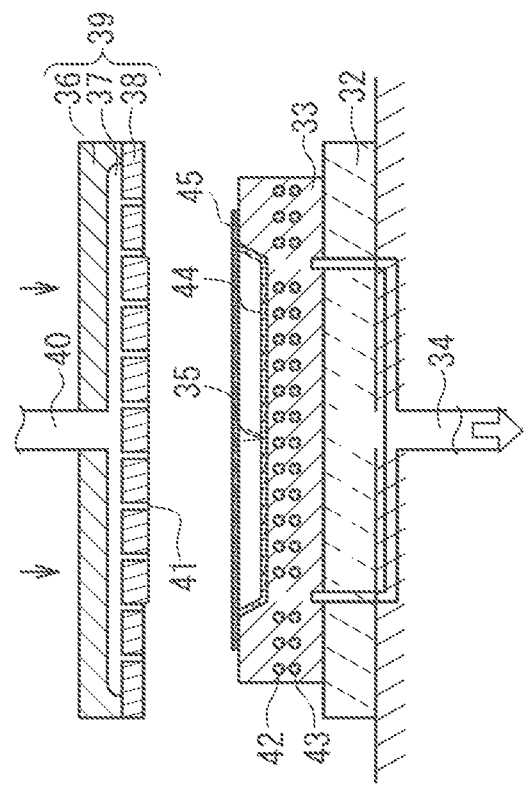
Figure 5B:
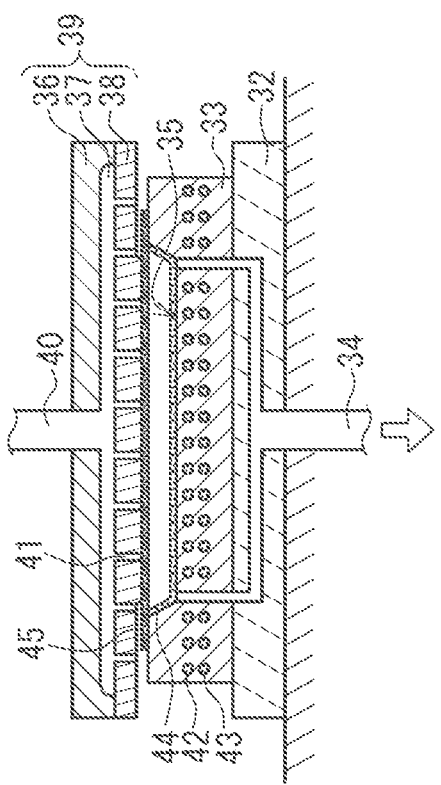

FIGS. 5A to 5D are schematic process diagrams illustrating a molding method. FIG. 5A illustrates a preparation process, FIG. 5B illustrates a heating process, FIG. 5C illustrates a heating vacuum pressure forming process, and FIG. 5D illustrates cooling and demolding processes. First, as illustrated in FIG. 5A, a stack of two or more resin-integrated fiber sheet 44 is placed on the lower mold 33, a bagging film 45 is covered over the stack, and the pressure is reduced from the vacuum line 34 of the lower mold 33. Next, as illustrated in FIG. 5B, the resin-integrated fiber sheets 44 are heated to a temperature equal to or higher than the softening point of the thermoplastic resin. Then, as illustrated in FIG. 5C, the stacked resin-integrated fiber sheets 44 are pressurized with compressed air from above the bagging film 45 to perform vacuum pressure forming. Lastly, as illustrated in FIG. 5D, a molded body 46 is cooled and taken out. As the bagging film, fluororesin films such as a polytetrafluoroethylene film, and heat-resistant films such as a polyimide resin film and a silicone resin film can be used.

Figure 6:
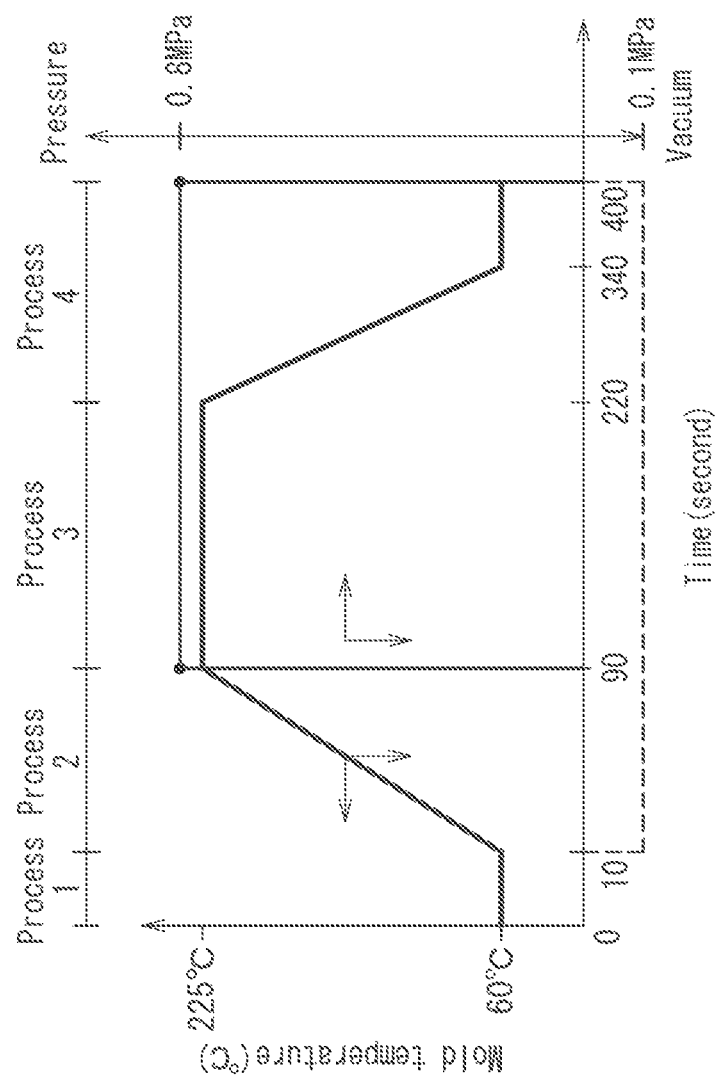
FIG. 6 is a graph illustrating process operations.

FIG. 6 is a graph illustrating process operations. In process 1, a stack of two or more resin-integrated fiber sheets 44 is placed on the lower mold, and the bagging film 45 is covered over the stack. In process 2, the pressure is reduced from the vacuum line 34 of the lower mold 33 while heating the stack. In process 3, the temperature is maintained for 120 seconds after reaching, for example, 225° C. while pressurizing the resin-integrated fiber sheets 44 with compressed air from above the bagging film 45 to perform vacuum pressure forming. In process 4, the resin-integrated fiber sheets are cooled while maintaining the pressurizing condition, and the resultant cooled molded body 46 is removed. The pressure reduction degree from the vacuum line 34 of the lower mold 33 is preferably 0 to 0.1 MPa, and air pressure from the compressed air pipe 40 of the upper mold 39 is preferably 0.1 to 2.0 MPa.

The following summarizes the advantages of the present invention.

(1) Since the resin-integrated fiber sheet is not a prepreg but a semipreg, direct molding is possible.

(2) Since the resin-integrated fiber sheet is not a prepreg but a semipreg, the sheet has excellent shapeability and moldability and can be molded in a high cycle.

(3) Since the thermoplastic resin is in a powder form and fused thermally, the resin can be smoothly impregnated between fibers. That is, unlike films, air can be appropriately released during molding, and voids are less likely to be formed.

(4) The fibers of the fiber-integrated resin sheet are continuous fibers such as carbon fibers (not short fibers). Thus, a resultant molded body is thin with high strength.

(5) During vacuum forming, the pressure is reduced from the lower part using suction, and preferably air pressure is applied from the upper part (vacuum pressure forming).

(6) Since the vacuum forming is a molding method of uniformly applying pressure using a bagging film, a large molded body can be produced.

(7) Since the vacuum forming is performed using a bagging film, the sheets can be formed into various shapes such as a flat plate shape and a deep-drawn three-dimensional shape.

(8) The heat history of the resin can be reduced.
Prepreg: long-time heating during sheet formation+heating during stampable sheet formation+preheating+heating during molding
Semipreg: short-time heating during sheet formation+heating during molding As stated above, the semipreg can speed up the molding time.

(9) Prepregs for molding (intermediate stack) and finished molded bodies can be produced.

(10) Since softened prepregs cool when transferred to a mold, the surface smoothness (mold transferability) of a resultant molded product is poor. The present invention involves direct molding, and the surface smoothness of a resultant molded product is high.

(11) Since softened prepregs cool when transferred to a mold, a molded product needs to have a certain thickness (a thin molded product cannot be obtained). The present invention involves direct molding, and such a transfer of a material to a mold is unnecessary.

EXAMPLES

Hereinafter, the present invention will be described specifically by way of examples. However, the present invention is not limited to the following examples.

Example 1

(1) Carbon Fiber Tow

Carbon fiber tows manufactured by MITSUBISHI CHEMICAL CORPORATION were used (product number: PYROFILE TR 50S15L, form: regular tow, filament count: 15K (15,000 filaments), filament diameter: 7 μm). An epoxy-based compound as a sizing agent was applied to carbon fibers of the carbon fiber tows.

(2) Spreading Tow

The tows were spread by a spreading device of FIG. 3. The tension of the carbon fiber filament groups (tows) during the spreading process was 15 N per 15,000 filaments to prepare a spread fiber sheet constituted by 15K carbon fiber filaments having a spread width of 500 mm and a thickness of 0.08 mm. The amount of the bridging fibers was 3.3 mass %.

(3) Semipreg

As dry resin powder, polypropylene having a melting point of 150° C. to 165° C. (manufactured by Prime Polymer Co., Ltd.) was used. The average particle diameter of the dry resin powder was 80 μm. The average application amount of the resin was 27.8 g on one surface and 55.6 g on both surfaces per 1 $m^2$ of the carbon fibers. The temperatures inside the heaters 16 and 19 were 170° C., and the residence times therein were 4 seconds each. The mass of the resultant resin-integrated fiber sheet was 75 g/$m^2$, with the fiber volume (VD being 45 vol % and the thermoplastic resin volume being 55 vol %.

(4) Stacking Conditions

The number of the stacked resin-integrated fiber sheets: 10 sheets Fiber directions of the resin-integrated fiber sheets: two directions (the sheets were stacked orthogonal to one another) 0°/90°/0°/90°/0°/0°/90°/0°/90°/0°

(5) Vacuum Pressure Forming

The vacuum pressure forming was performed using the machine and conditions illustrated in FIGS. 4 to 6.

Process 1: A stack of two or more of the resin-integrated fiber sheets was placed on the lower mold, over which a bagging film was covered. As the bagging film, a fluororesin film having a thickness of 2 mm was used.

Process 2: The pressure was reduced at 0.1 MPa from the vacuum line of the lower mold, and at the same time with the pressure reduction, the heating was started.

Process 3: The temperature was maintained for 120 seconds after reaching 225° C., and at the same time, the resin-integrated fiber sheets were pressurized with compressed air at 0.8 MPa from above the bagging film to perform vacuum pressure forming.

Process 4: The resin-integrated fiber sheets were cooled to 60° C. while maintaining the pressurizing condition, the pressure reduction line and the pressurization line were disconnected after cooling, and a resultant molded body was removed.

One cycle from process 1 to process 4 was 400 seconds.

Example 2

A molded body of Example 2 was produced in the same manner as in Example 1 except for the molding conditions as indicated in Table 1.

Table 1 shows the molding conditions.

TABLE 1

| Molding conditions | | Example 1 | Example 2 |
|---|---|---|---|
| Size of molded body | | Length 750 mm, Width 450 mm | Length 300 mm, Width 250 mm |
| Molding temperature | | 225° C. | 225° C. |
| Pressure | Pressure reduction | 0.1 MPa | 0.1 MPa |
| | Pressurization | 0.8 MPa | 0.6 MPa |
| Molding time | Heating | 90 seconds | 90 seconds |
| | Molding | 120 seconds | 90 seconds |
| | Cooling | 120 seconds | 120 seconds |

Figure 7:
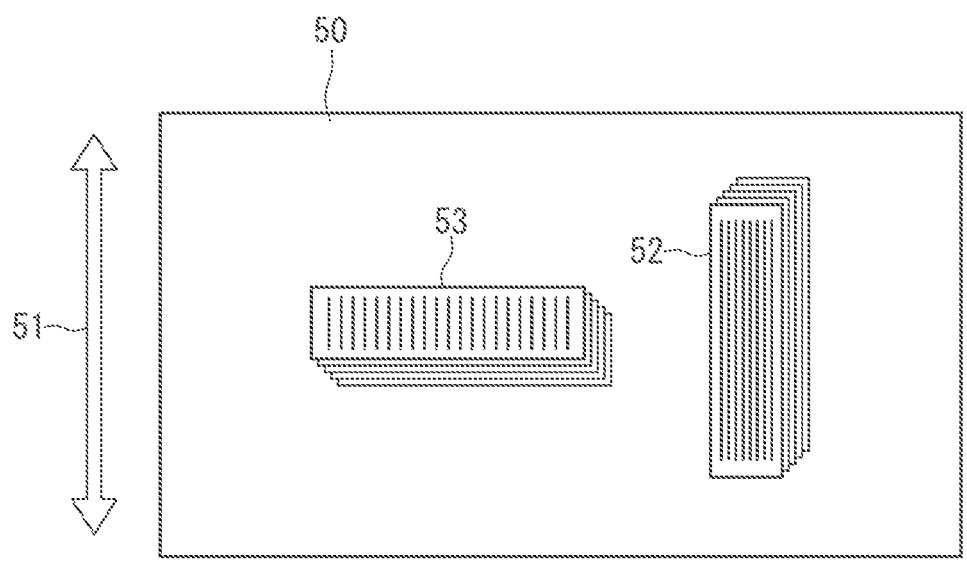
FIG. 7 is a schematic explanatory view illustrating sample cutting directions in an example of the present invention.

Measurement samples were cut out as illustrated in FIG. 7 from the molded products produced in the examples. Specifically, six samples 52 that were long along the warp direction of a molded product 50 (indicated by an arrow 51, surface fiber direction: 0°) and six samples 53 (surface fiber direction: 90°) were cut out from each of the molded products. The samples thus prepared were left for at least 48 hours at a temperature of 23° C. and a relative humidity of 50%. Then, the length, the width, and the thickness of each sample were measured. Table 2 shows the averages.

TABLE 2

| Sample | Thickness (mm) | Width (mm) | Length (mm) |
|---|---|---|---|
| Example 1 (0° direction) | 1.04 | 14.38 | 80.00 |
| Example 1 (90° direction) | 1.07 | 14.64 | 80.00 |

TABLE 2-continued

| Sample | Thickness (mm) | Width (mm) | Length (mm) |
|---|---|---|---|
| Example 2 (0° direction) | 1.09 | 14.67 | 80.00 |
| Example 2 (90° direction) | 1.05 | 14.52 | 80.00 |

<Three-Point Flexural Test>

The prepared samples underwent the three-point flexural test in accordance with JIS K7074. The measuring conditions were as follows. Table 3 shows the averages of the measured values of the samples.

Jig: Indenter=R5, fulcrum=R2 (R is the radius of the corner, unit: mm)
Lower support interval: 60 mm
Test speed: 5 mm/min <Surface Roughness Test>

The prepared samples underwent the surface roughness test in accordance with JIS B0601. The measuring conditions were as follows. Table 4 shows the averages of the measured values of the samples.

Measuring instrument: SURFTEST 201 (Mitutoyo Corporation)
Needle material: Diamond
Needle tip radius: 5 μm
Measuring force: 4 mN
Driving method: One reciprocating movement (automatic retreat)
Driving speed: 0.5 mm/second during measurement, 1 mm/second during retreat
Cutoff length: 0.8 mm
Reference length: 0.8 mm
Evaluation length: 4 mm
Sampling interval: 0.8 μm

TABLE 3

| | Elastic modulus (GPa) | Maximum point | | | |
|---|---|---|---|---|---|
| | | Testing force (N) | Displacement (mm) | Stress (MPa) | Strain (%) |
| Example 1 (0° direction) | 53.93 | 39.34 | 3.58 | 227.1 | 0.620 |
| Example 1 (90° direction) | 28.85 | 26.72 | 3.17 | 142.2 | 0.566 |
| Example 2 (0° direction) | 49.10 | 32.77 | 3.14 | 169.0 | 0.570 |
| Example 2 (90° direction) | 28.90 | 29.78 | 3.96 | 166.8 | 0.695 |

TABLE 4

| | Roughness parameter (μm) | | |
|---|---|---|---|
| | Ra | Rq | Rp |
| Example 1 (0° direction) | 0.22 | 0.29 | 0.8 |
| Example 1 (90° direction) | 0.38 | 0.49 | 1.2 |
| Example 2 (0° direction) | 0.24 | 0.30 | 0.8 |
| Example 2 (90° direction) | 0.37 | 0.47 | 1.3 |

The results of the three-point flexural test shown in Table 3 clearly indicate that the molded products of Examples 1 and 2 have satisfactory performance for practical use. Table 4 clearly indicates that the molded products of Examples 1 and 2 have smooth surfaces and can be used as finished molded bodies.

INDUSTRIAL APPLICABILITY

The fiber reinforced resin molded body of the present invention can be widely used in general industrial applications including building members, laptop housings, IC trays, sports goods such as shoes and sticks, windmills, automobiles, railroad vehicles, ships, aircraft, and spacecraft.

DESCRIPTION OF REFERENCE NUMERALS

1 Resin-integrated carbon fiber sheet
2 Unidirectional carbon fibers
3, 3a, 3b Bridging fibers
4 Resin
5 Part to which resin does not adhere
6 Spreading device
7 Feed bobbin
8 Carbon fiber filament group (carbon fiber tow before spreading)
9a, 9b Nip roller
12a, 12b Bridge roller
13a-13g Guide roller
14, 17 Powder feed hopper
15, 18 Dry resin powder
16, 19 Heater
20 Take-up roller
21a-21j Spreading roller
23 Roller spreading process
24 Bridging fiber generating process
25 Resin powder applying process
30 Vacuum pressure forming machine
31 Base
32 Mold base
33 Lower mold
34 Vacuum line
35 Mold surface
36 Upper mold main body
37 Air groove
38 Faceplate
39 Upper mold
40 Compressed air pipe
41 Air vent
42 Heater
43 Water cooled tube
44 Resin-integrated fiber sheet
45 Bagging film
46 Molded body
50 Molded product
51 Warp direction of molded product
52 Sample (surface fiber direction: 0°)
53 Sample (surface fiber direction: 90°)

The invention claimed is:

1. A fiber reinforced resin molded body constituted from a resin-integrated fiber sheet,
   wherein the resin-integrated fiber sheet comprises:
   A. unidirectional continuous fibers that are spread fibers of a continuous fiber group and arrayed in parallel in one direction;
   B. bridging fibers that lie in directions stereoscopically crossing the unidirectional continuous fibers; and
   C. thermoplastic resin that is present on only part of a surface of the unidirectional continuous fibers to unify the unidirectional continuous fibers and the bridging fibers,
   wherein the resin-integrated fiber sheet is a semipreg in which the thermoplastic resin in a powder form serving as a matrix adheres to the unidirectional continuous fibers and the bridging fibers through thermal fusion,
   wherein the bridging fibers are generated from the continuous fiber group during or after the spreading of the continuous fiber group, and the bridging fibers are oriented in various directions on the surface of the spread unidirectional continuous fibers,
   wherein the unidirectional continuous fibers constitute 75 to 99% by mass, and the bridging fibers constitute 1 to 25% by mass, with respect to a total 100% by mass of the unidirectional continuous fibers and the bridging fibers,
   wherein the resin-integrated fiber sheet has a fiber volume (Vf) of 20 to 65% by volume and a thermoplastic resin volume of 35 to 80% by volume, and
   wherein the fiber reinforced resin molded body is a vacuum formed body in which two or more of the resin-integrated fiber sheets are stacked.

2. The fiber reinforced resin molded body according to claim 1, wherein the unidirectional continuous fibers are at least one selected from the group consisting of carbon fibers, glass fibers, and high elastic modulus fibers having an elastic modulus of 380 cN/dtex or more.

3. The fiber reinforced resin molded body according to claim 1, wherein the resin-integrated fiber sheet has a thickness of 0.01 to 5.0 mm.

4. The fiber reinforced resin molded body according to claim 1, wherein the thermoplastic resin is at least one selected from the group consisting of polyamide resins, polycarbonate resins, polypropylene resins, polyester resins, polyethylene resins, acrylic resins, phenoxy resins, polystyrene resins, polyimide resins, and polyether ether ketone resins.

5. The fiber reinforced resin molded body according to claim 1, wherein the resin-integrated fiber sheet has a mass per unit area of 10 to 3000 g/m$^2$.

6. A method for producing a fiber reinforced resin molded body, comprising:
   stacking two or more of resin-integrated fiber sheets; and
   subjecting the stacked resin-integrated fiber sheets to vacuum forming,
   wherein the stacked resin-integrated fiber sheets are subjected to the vacuum forming from a lower mold with a vacuum line and pressurized with compressed air from an upper mold,
   wherein each of the resin-integrated fiber sheets comprises:
   A. unidirectional continuous fibers that are spread fibers of a continuous fiber group and arrayed in parallel in one direction;
   B. bridging fibers that lie in directions stereoscopically crossing the unidirectional continuous fibers; and
   C. thermoplastic resin that is present on only part of a surface of the unidirectional continuous fibers to unify the unidirectional continuous fibers and the bridging fibers,
   wherein the resin-integrated fiber sheet is a semipreg in which the thermoplastic resin in a powder form serving as a matrix adheres to the unidirectional continuous fibers and the bridging fibers through thermal fusion,
   wherein the bridging fibers are generated from the continuous fiber group during or after the spreading of the continuous fiber group, and the bridging fibers are oriented in various directions on the surface of the spread unidirectional continuous fibers,
   wherein the unidirectional continuous fibers constitute 75 to 99% by mass, and the bridging fibers constitute 1 to 25% by mass, with respect to a total 100% by mass of the unidirectional continuous fibers and the bridging fibers, and wherein the resin-integrated fiber sheet has a fiber volume (Vf) of 20 to 65% by volume and a thermoplastic resin volume of 35 to 80% by volume.

7. The method according to claim 6, wherein the vacuum forming is vacuum pressure forming.

8. The method according to claim 6, wherein the vacuum forming uses a vacuum forming machine that comprises a lower mold with a vacuum line and an upper mold for pressurization to perform the following processes:
   a. placing a stack of two or more of the resin-integrated fiber sheets on the lower mold and covering a bagging film over the stack;
   b. reducing the pressure from the vacuum line of the lower mold while heating the stack;
   c. pressurizing the stack heated to a temperature equal to or higher than a softening point of the thermoplastic resin, with compressed air from above the bagging film to perform vacuum pressure forming; and
   d. cooling the stack while maintaining the pressurizing condition and removing a resultant cooled molded body.

* * * * *